(12) United States Patent  
Formanski et al.

(10) Patent No.: US 7,831,343 B2  
(45) Date of Patent: Nov. 9, 2010

(54) EFFICIENCY OPTIMIZED HYBRID OPERATION STRATEGY

(75) Inventors: Volker Formanski, Wiesbaden (DE); Peter Kilian, Heidelberg (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1041 days.

(21) Appl. No.: 11/592,938

(22) Filed: Nov. 3, 2006

(65) Prior Publication Data

US 2008/0133076 A1 Jun. 5, 2008

(51) Int. Cl.
*G05D 3/00* (2006.01)

(52) U.S. Cl. .............................. 701/22; 307/46; 307/64; 320/101; 320/104; 903/903; 903/905; 180/65.28

(58) Field of Classification Search ................... 701/22; 700/295; 307/46, 64; 320/101, 104; 903/903, 903/908; 180/65.28; 318/376
See application file for complete search history.

(56) References Cited

U.S. PATENT DOCUMENTS

| | | | | |
|---|---|---|---|---|
| 5,910,722 | A * | 6/1999 | Lyons et al. | 320/104 |
| 5,929,595 | A * | 7/1999 | Lyons et al. | 320/104 |
| 5,941,328 | A * | 8/1999 | Lyons et al. | 180/65.1 |
| 6,321,144 | B1 * | 11/2001 | Crombez | 701/22 |
| 7,456,509 | B2 * | 11/2008 | Gray, Jr. | 290/40 C |
| 2005/0181246 | A1* | 8/2005 | Nakaji | 429/13 |
| 2005/0284675 | A1* | 12/2005 | Sanchen | 180/65.2 |
| 2006/0006008 | A1* | 1/2006 | Brunemann et al. | 180/65.2 |
| 2006/0052916 | A1* | 3/2006 | Hoch et al. | 701/22 |
| 2006/0112688 | A1* | 6/2006 | Vos et al. | 60/598 |
| 2006/0113129 | A1* | 6/2006 | Tabata | 180/65.2 |
| 2007/0080664 | A1* | 4/2007 | Maguire et al. | 320/116 |
| 2007/0151783 | A1* | 7/2007 | Yamauchi | 180/65.3 |

(Continued)

FOREIGN PATENT DOCUMENTS

JP 55125004 A * 9/1980

(Continued)

OTHER PUBLICATIONS

Energy Management in a Fuel Cell/Supercapacitor Multisource/Multiload Electrical Hybrid System;Payman, A.; Pierfederici, S.; Meibody-Tabar, F.; Power Electronics, IEEE Transactions on; vol. 24, Issue 12, Dec. 2009 pp. 2681-2691; Digital Object Identifier 10.1109/TPEL.2009.2028426.*

(Continued)

*Primary Examiner*—Cuong H Nguyen
(74) *Attorney, Agent, or Firm*—John A. Miller; Miller IP Group, PLC

(57) ABSTRACT

A propulsion system for a fuel cell hybrid vehicle that includes a fuel cell system and an EESS, where the propulsion system employs an algorithm for increasing system efficiency. A power limit value is defined as the maximum system efficiency times the charge/discharge efficiency of the EESS. If the vehicle operator requests a power greater than the power limit value, then the fuel cell system will preferably provide the power, and if the power request from the vehicle operator is less than the power limit value, then the EESS will preferably provide the power. The algorithm also considers changing operation conditions and parameters that impact the fuel cell system efficiency and the electric energy storage system efficiency, such as the state of charge of the EESS and regenerative braking.

20 Claims, 3 Drawing Sheets

U.S. PATENT DOCUMENTS

| | | | |
|---|---|---|---|
| 2007/0182350 A1* | 8/2007 | Patterson et al. | 318/432 |
| 2008/0133076 A1* | 6/2008 | Formanski et al. | 701/22 |
| 2008/0297113 A1* | 12/2008 | Saeki et al. | 320/128 |
| 2009/0097959 A1* | 4/2009 | Vos et al. | 415/1 |
| 2009/0131215 A1* | 5/2009 | Shamoto | 477/3 |
| 2009/0206793 A1* | 8/2009 | Maguire et al. | 320/118 |
| 2009/0244944 A1* | 10/2009 | Jang et al. | 363/126 |
| 2009/0248229 A1* | 10/2009 | Okamura et al. | 701/22 |
| 2009/0261599 A1* | 10/2009 | Alston et al. | 290/40 B |
| 2009/0309416 A1* | 12/2009 | Bose et al. | 307/9.1 |
| 2010/0024859 A1* | 2/2010 | Bell et al. | 136/201 |
| 2010/0065357 A1* | 3/2010 | Oyama et al. | 180/65.265 |
| 2010/0114395 A1* | 5/2010 | Hinatsu et al. | 700/295 |

FOREIGN PATENT DOCUMENTS

| | | | |
|---|---|---|---|
| JP | 58058881 A | * | 4/1983 |
| JP | 2007-140732 | * | 5/2007 |
| JP | 2007-301290 | * | 11/2007 |
| WO | PCT/JP2006/309764 | * | 10/2007 |
| WO | PCT/JP2008/051330 | * | 1/2008 |
| WO | PCT/JP2008/052771 | * | 2/2008 |

OTHER PUBLICATIONS

An Integrated Power Supply System for Low Power 3.3 V Electronics Using On-Chip Polymer Electrolyte Membrane (PEM) Fuel Cells;Frank, M.; Kuhl, M.; Erdler, G.; Freund, I.; Manoli, Y.; Muller, C.; Reinecke, H.; Solid-State Circuits, IEEE Journal of vol. 45, Issue 1, Jan. 2010 pp. 205-213;Digital Object Identifier 10.1109/JSSC.2009.2034441.*

Power-Electronics-Based Solutions for Plug-in Hybrid Electric Vehicle Energy Storage and Management Systems;Amjadi, Z.; Williamson, S. S.; Industrial Electronics, IEEE Transactions on; vol. 57, Issue 2, Feb. 2010 pp. 608-616 Digital Object Identifier 10.1109/TIE.2009.2032195.*

Design and Control Methodology of Plug-in Hybrid Electric Vehicles;Gao, Y.; Ehsani, M.; Industrial Electronics, IEEE Transactions on; vol. 57, Issue 2, Feb. 2010 pp. 633-640; Digital Object Identifier 10.1109/TIE.2009.2027918.*

Analysis of Supercapacitor as Second Source Based on Fuel Cell Power Generation; Thounthong, P.; Rael, S.; Davat, B.; Energy Conversion, IEEE Transactions on; vol. 24, Issue 1, Mar. 2009 pp. 247-255 ; Digital Object Identifier 10.1109/TEC.2008.2003216.*

Special Section on Vehicular Energy-Storage Systems; Khaligh, A.; Miraoui, A.; Garret, D.; Vehicular Technology, IEEE Transactions on; vol. 58, Issue 8, Oct. 2009 pp. 3879-3881; Digital Object Identifier 10.1109/TVT.2009.2029194.*

Comparative Study of Fuel-Cell Vehicle Hybridization with Battery or Supercapacitor Storage Device;Thounthong, P.; Chunkag, V.; Sethakul, P.; Davat, B.; Hinaje, M.; Vehicular Technology, IEEE Transactions on; vol. 58, Issue 8, Oct. 2009, pp. 3892-3904; Digital Object Identifier 10.1109/TVT.2009.2028571.*

Power Management for Fuel-Cell Power System Cold Start; Ke Jin; Xinbo Ruan; Mengxiong Yang; Min Xu; Power Electronics, IEEE Transactions on; vol. 24, Issue 10, Oct. 2009 pp. 2391-2395; Digital Object Identifier 10.1109/TPEL.2009.2020559.*

Influence of Battery/Ultracapacitor Energy-Storage Sizing on Battery Lifetime in a Fuel Cell Hybrid Electric Vehicle; Schaltz, E.; Khaligh, A.; Rasmussen, P.O.; Vehicular Technology, IEEE Transactions on; vol. 58, Issue 8, Oct. 2009 pp. 3882-3891; Digital Object Identifier 10.1109/TVT.2009.2027909.*

Fuel-Cell Hybrid Powertrain: Toward Minimization of Hydrogen Consumption; Bernard, J.; Delprat, S.; Buchi, F.N.; Guerra, T.M.; Vehicular Technology, IEEE Transactions on; vol. 58, Issue 7, Sep. 2009 pp. 3168-3176; Digital Object Identifier 10.1109/TVT.2009.2014684.*

Fuel cells and fuel batteriesyan engineering view; Liebhafsky, H. A.; Spectrum, IEEE; vol. 3, Issue 12, Dec. 1966 ; pp. 48-56; Digital Object Identifier 10.1109/MSPEC.1966.5217076.*

An Analytical Optimization Method for Improved Fuel Cell—Battery—Ultracapacitor Powertrain; Bauman, J.; Kazerani, M.; Vehicular Technology, IEEE Transactions on; vol. 58, Issue 7, Sep. 2009 pp. 3186-3197; Digital Object Identifier 10.1109/TVT.2009.2014843.*

Neural Network Self-adaptive PID Control for Driving and Regenerative Braking of Electric Vehicle; Jianbo Cao et al.; Automation and Logistics, 2007 IEEE International Conference on; Digital Object Identifier: 10.1109/ICAL.2007.4338908 Publication Year: 2007 , pp. 2029-2034.*

Robust control for regenerative braking of battery electric vehicle; Ye, M. et al.; Control Theory & Applications, IET; vol. 2 , Issue: 12; Digital Object Identifier: 10.1049/iet-cta:20070333; Publication Year: 2008 , pp. 1105-1114.*

Power Management Strategy with Regenerative Braking for Fuel Cell Hybrid Electric Vehicle; Yu Shuang et al.; Power and Energy Engineering Conference, 2009. APPEEC 2009. Asia-Pacific; Digital Object Identifier: 10.1109/APPEEC.2009.4918610 Publication Year: 2009 , pp. 1-4.*

Regenerative-braking sliding mode control of electric vehicle based on neural network identification; Jianbo Cao et al.; Advanced Intelligent Mechatronics, 2008. AIM 2008. IEEE/ASME International Conference on ; Digital Object Identifier: 10.1109/AIM.2008.4601836; Publication Year: 2008 , pp. 1219-1224.*

* cited by examiner

EFFICIENCY OPTIMIZED HYBRID OPERATION STRATEGY

BACKGROUND OF THE INVENTION

1. Field of the Invention

This invention relates generally to a fuel cell hybrid vehicle with a propulsion system that employs an algorithm for efficiently determining a distributed power draw from a fuel cell system (FCS) and an electric energy storage system (EESS) and, more particularly, to a fuel cell hybrid vehicle that employs an algorithm for efficiently determining the distributed power draw from an FCS and an EESS by defining a power limit value and using EESS power if a power request is below the power limit value and using fuel cell system power if the power request is above the power limit value.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system for a vehicle is limited. Further, the time delay from system start-up to driveability and low acceleration of the vehicle may not be acceptable. The voltage cycles can decrease the stack durability. These drawbacks can be minimized by using a high voltage battery in parallel with the fuel cell system. Algorithms are employed to provide the distribution of power from the battery and the fuel cell system to meet the requested power.

Some fuel cell vehicles are hybrid vehicles that employ an electric energy storage system (EESS) in addition to the fuel cell system, such as a DC battery or a super capacitor (also referred to as an ultra-capacitor or double layer capacitor). The EESS provides supplemental power for the various vehicle auxiliary loads, for system start-up and during high power demands when the fuel cell system is unable to provide the desired power. More particularly, the fuel cell system provides power to a traction motor and other vehicle systems through a DC voltage bus line to an electric traction system (ETS) for vehicle operation. The EESS can provide supplemental power to the voltage bus line during those times when additional power is needed beyond what the fuel cell system provides, such as during heavy acceleration. For example, the fuel cell system may provide 70 kW of power. However, vehicle acceleration may require 100 kW or more of power. The fuel cell system can be used to recharge the EESS at those times when the fuel cell system is able to meet the system power demand alone and is also able to produce additional power. The generator power available from the traction motor during regenerative braking is also used to recharge the battery through the DC bus line.

It is desirable to increase system performance, reduce hydrogen consumption, reduce component wear and tear, etc., in a fuel cell hybrid vehicle by operating the fuel cell system as efficiently as possible. Particularly, it is desirable to provide the desired mechanical output for the electric traction system by using the minimal amount of hydrogen. For a fuel cell hybrid vehicle, the hydrogen to wheel efficiency is a typical reference value that can be increased by the usage of regenerative braking and the optimized operation of the fuel cell system as the primary source within the propulsion system. To use the complete potential of regenerative braking, the EESS needs to be big enough to capture as much of the deceleration energy as possible for all power peaks. The size of the EESS is an important design consideration for the vehicle propulsion system, which is influenced and limited by cost, weight and performance requirements.

Certain operation strategies for hybrid fuel cell vehicles are primarily based on capturing the regenerative energy from vehicle braking. The control system for the hybrid power system considers this strategy by using primarily the EESS as a power source as long as the state of charge (SOC) of the EESS is within the defined thresholds. If the EESS is not able to completely provide the power request or to provide any power due to its SOC, the fuel cell system covers the power request. For high power demand requests greater than the maximum power of the fuel cell system, the EESS provides the excess power. If the SOC of the EESS does not allow for the discharge, the hybrid power system is only able to provide the maximum power from the fuel cell system.

Another part of optimizing a vehicle hybrid propulsion system is to disconnect the direct link between the power request from the vehicle based on the driver power request and the power of the primary source of the propulsion system by using the EESS as a buffer to increase the overall efficiency of the system. This optimization element needs to be integrated in the operation strategy of the propulsion system with the target to operate the fuel cell system mainly within its high efficient regions.

SUMMARY OF THE INVENTION

In accordance with the teachings of the present invention, a propulsion system for a fuel cell hybrid vehicle is disclosed that includes a fuel cell system (FCS) and an electric energy storage system (EESS), where the propulsion system employs an algorithm for increasing system efficiency. A power limit value is defined considering the maximum FCS efficiency and the efficiency of the EESS. If the vehicle operator requests a power greater than the power limit value, then the fuel cell system will provide the power, and if the power request from the vehicle operator is less than the power limit value, then the EESS will provide the power. The algorithm also considers changing operation conditions and parameters that impact the fuel cell system efficiency and the electric energy storage system efficiency, such as the state of charge of the EESS and regenerative braking.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an algorithm for optimizing the efficiency of a fuel cell hybrid vehicle is merely exemplary in nature, and is in no way intended to limit the invention or its applications or uses.

Figure 1:
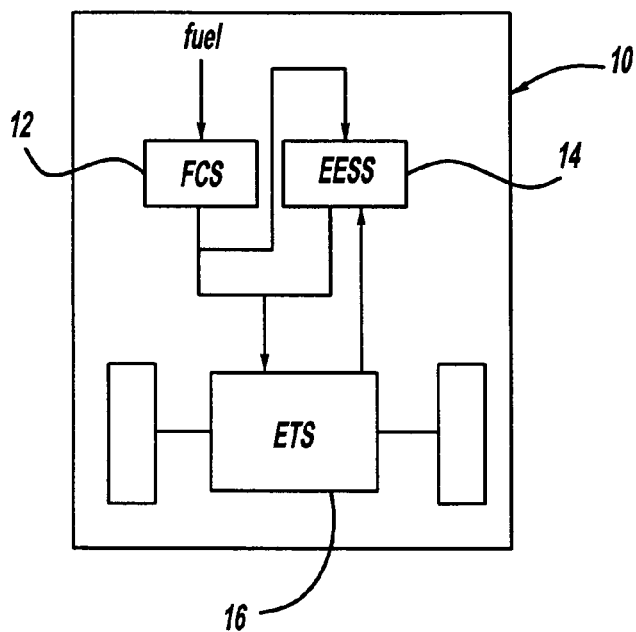
FIG. 1 is a block diagram of a propulsion system for a fuel cell hybrid vehicle including a fuel cell system (FCS), an electric energy storage system (EESS) and an electric traction system (ETS) that employs a power distribution algorithm, according to an embodiment of the present invention.

FIG. 1 is a block diagram of a fuel cell hybrid propulsion system 10 including a fuel cell system (FCS) 12, an EESS 14, and an ETS 16. The EESS 14 can be any suitable device, such as a battery, an accumulator, a super-capacitor and combinations thereof. Further required power electronic components are not shown to reduce the description to the necessary elements. As will be discussed in detail below, the present invention proposes an algorithm for providing efficient operation of a fuel cell system by determining when the requested power from the ETS 16 will be provided by the fuel cell system 12, when the requested power from the ETS 16 will be provided by the EESS 14, when the requested power from the ETS 16 will be provided by both the fuel cell system 12 and the EESS 14, when the fuel cell system 12 will be used to charge the EESS 14 and when regenerative braking from the ETS 16 will be used to charge the EESS 14. Generally, the fuel cell system 12 is used to provide the requested power as long as the indirect power path through the EESS 14 is not more efficient. Therefore, the fuel cell system 12 is used to charge the EESS 14, but only if charging the EESS 14 and providing the energy through the EESS 14 to the ETS 16 is more efficient than providing the traction power directly from the fuel cell system 12.

Figure 2:
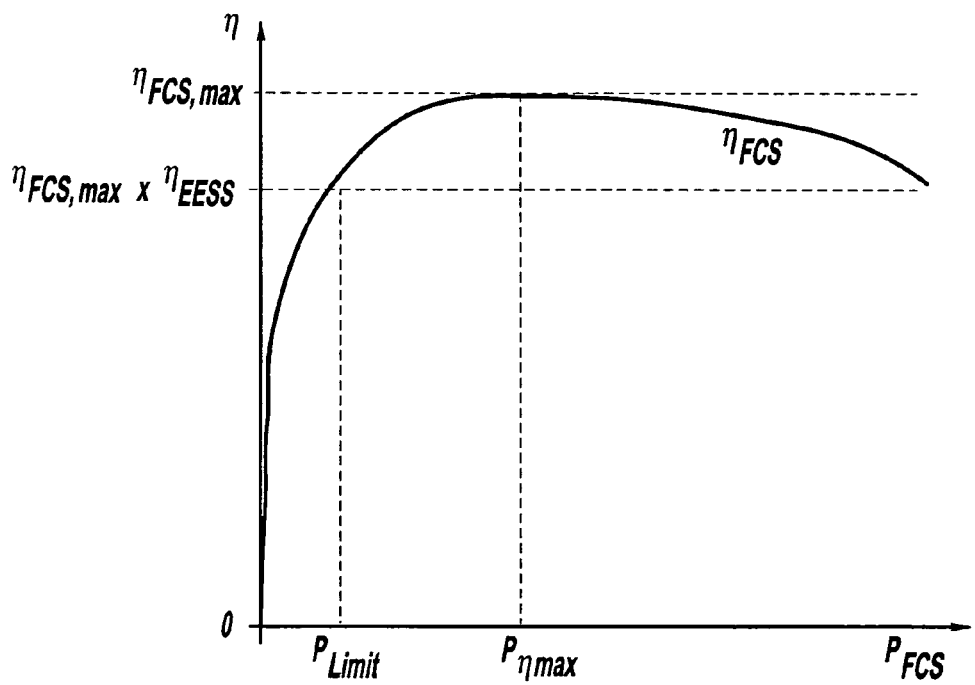
FIG. 2 is a graph with fuel cell system power on the horizontal axis and efficiency on the vertical axis showing a power limit value defined for system efficiency, according to an embodiment of the present invention.

FIG. 2 shows a typically efficiency behavior of the FCS 12 as an example. At lower FCS power the efficiency of the FCS decreases, where the lowest efficiency is at FCS idle. At higher fuel cell system power, the fuel cell system efficiency also decreases, but not as quickly as at the low power region. At full FCS power the efficiency is typically in the range of 20-30% of the maximum efficiency of the FCS. The maximum efficiency of the FCS is reached in the middle area of the graph marked as $P_{\eta,max}$.

From the graph in FIG. 2 and the known charge/discharge efficiency of the EESS 14, the operating strategy of the fuel cell hybrid propulsion system 10 can be identified as when to use the FCS 12 or the EESS 14 as the preferred power source for the most efficient way to operate the hybrid propulsion system 10. According to the invention, a power limit value $P_{limit}$ is defined where generally if the vehicle operator requests a power greater than the power limit value $P_{limit}$, then the fuel cell system 12 will provide the power, and if the power request from the vehicle operator is less than the power limit value $P_{limit}$, then the power will be provided by the EESS 14. In this embodiment, the power limit value $P_{limit}$ is defined as a value where the efficiency point represented by the maximum FCS efficiency $\eta_{FCS,max}$ times the charge/discharge efficiency of the EESS 14 $\eta_{bat}$ crosses the efficiency curve. The EESS efficiency $\eta_{bat}$ is determined by the charge/discharge ratio of the EESS 14. Particularly, if the power request from the ETS 16 is greater than the power limit value $P_{limit}$, it is more efficient to provide the requested power from the fuel cell system 12. If the power request from the ETS 16 is less than the power limit value $P_{limit}$, it is more efficient to provide the requested power from the EESS 14. The EESS 14 is charged by the fuel cell system 12 at its highest efficiency value of $\eta_{FCS,max}$. The determination of the power limit value can be adapted during vehicle operation to consider changing operation parameters and conditions.

By considering the SOC of the EESS 14, the fuel cell system 12 provides only higher propulsion system efficiency if the fuel cell system 12 is operated in power regions where the following relationship is fulfilled:

$$\eta_{FCS} > \eta_{FCS,max} \times \eta_{EESS}$$

By knowing the fuel cell system efficiency curve and the charge/discharge efficiency of the EESS 14 with all its impacts, a power strategy in this manner can be provided. By changing the operating conditions for the EESS 14 and the FCS 12, the efficiency curve will change, which needs to be considered. Based on usual fuel cell system efficiency curve, the indirect power path through the EESS 14 makes sense at lower requested power or may be at higher power peaks where the fuel cell system 12 efficiency drops down under the power limit value $P_{limit}$.

The fuel cell system efficiency $\eta_{FCS}$ is the ratio between the amount of electricity generated by the fuel cell system 12 and the amount of hydrogen that is consumed by the fuel cell system 12. The maximum fuel cell system efficiency is represented as $\eta_{max}$, where the value $P_{\eta max}$ is the power output of the fuel cell system 12 at the maximum efficiency $\eta_{max}$. Of course, it is not possible to operate the FCS 12 at the maximum power efficiency $P_{\eta max}$ all the time because the driver will request different power levels for operation of the vehicle across the spectrum that the propulsion system 10 is able to produce.

As discussed above, if the requested power from the ETS 16 is lower than the power limit value $P_{limit}$, the EESS 14 is used to provide the power request, and is charged by the fuel cell system 12 as long as the state of charge (SOC) of the EESS 14 is below its maximum allowable limit. The fuel cell system power with the maximum efficiency is in this case higher than the requested traction power, therefore, a pulsing operation of the fuel cell system 12 is required as a result of the changing in the state of charge of the EESS 14.

Figure 3:
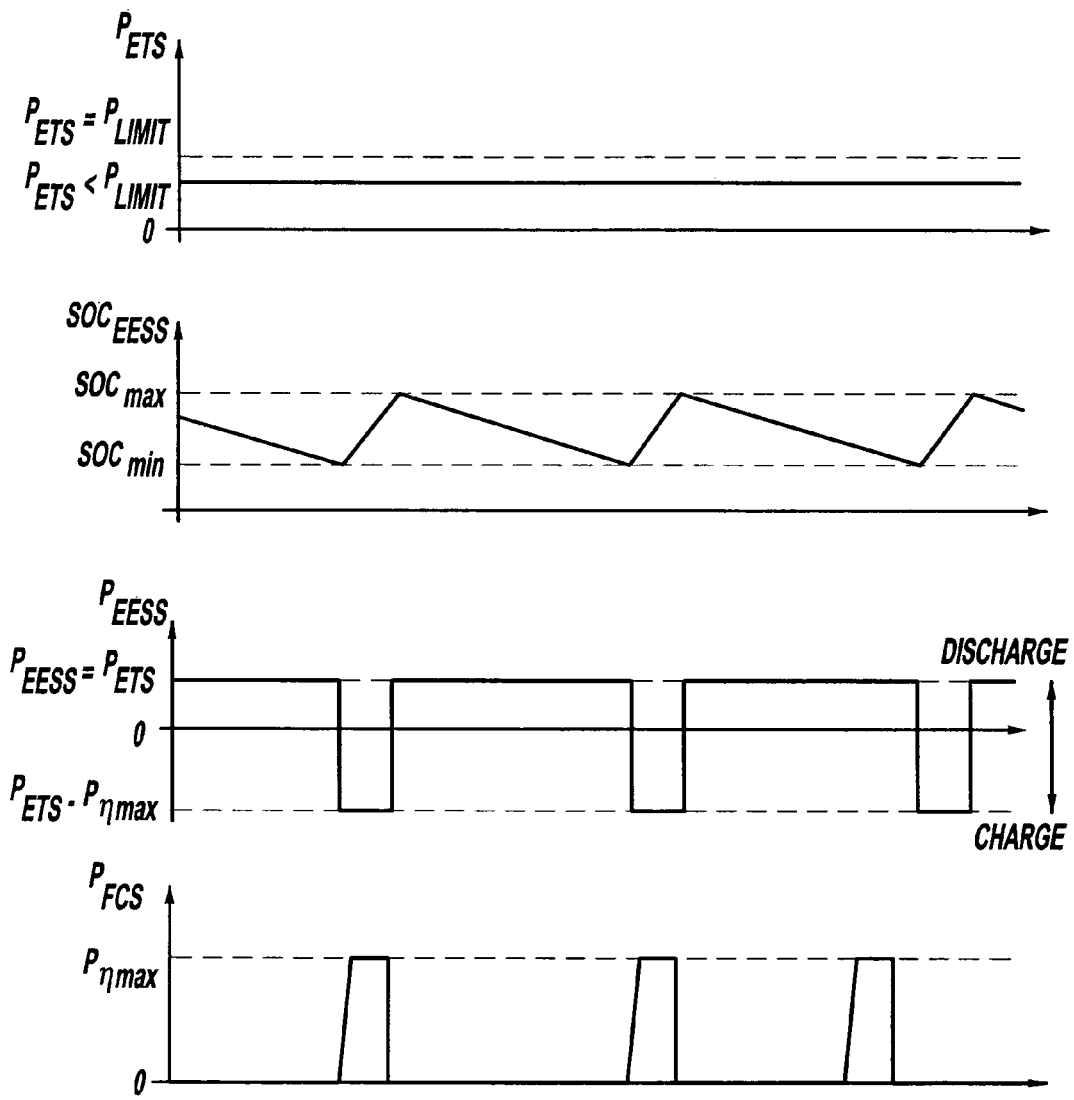
FIG. 3 is a series of graphs showing the relationship between an ETS power request, an EESS state of charge, EESS output power and FCS output power for a particular vehicle in a particular system state that employs a power algorithm of the invention for providing system efficiency.

FIG. 3 is a series of graphs with time on the horizontal axis, power request from the ETS 16 ($P_{ETS}$) on the vertical axis of the top graph, state of charge of the EESS 14 ($SOC_{EESS}$) on the vertical axis of the second graph, power provided by the EESS 14 ($P_{EESS}$) on the vertical axis of the third graph and fuel cell system power $P_{FCS}$ on the vertical axis of the bottom graph showing a case where the power request from the ETS 16 is below the power limit value $P_{limit}$. In this example, the EESS 14 will provide the power request until the EESS SOC falls to a minimum SOC ($SOC_{min}$), at which time the fuel cell system 12 will take over providing the requested power. Because of running the FCS 12 at its maximum efficiency point the FCS 12 provides more power than requested by the ETS 16 and will additionally charge the EESS 14, as shown by the third and fourth graphs.

To increase or maximize the life of the EESS 14, a certain SOC limit of charging and discharging the EESS 14 needs to be considered. Therefore, during operation, the EESS SOC should stay within the state of charge limits of $SOC_{min}$ and $SOC_{max}$. When the SOC of the EESS 14 reaches the minimum SOC and the power request is less than the power limit value $P_{limit}$, the EESS 14 stops providing power to the ETS 16, and the fuel cell system 12 is used to provide the requested power. The fuel cell system 12 is operated at its maximum efficiency $P_{\eta max}$ to also charge the EESS 14. After the EESS SOC reaches a maximum SOC limit ($SOC_{max}$), the fuel cell system 12 is returned to an idle mode, and the EESS 14 again provides the requested power. It is desirable to operate the fuel cell system 12 at the maximum efficiency $P_{\eta max}$, however, the fuel cell system 12 does not provide power to the ETS 16 or the EESS 14 with a power level lower than the power limit value $P_{limit}$.

Figure 4:
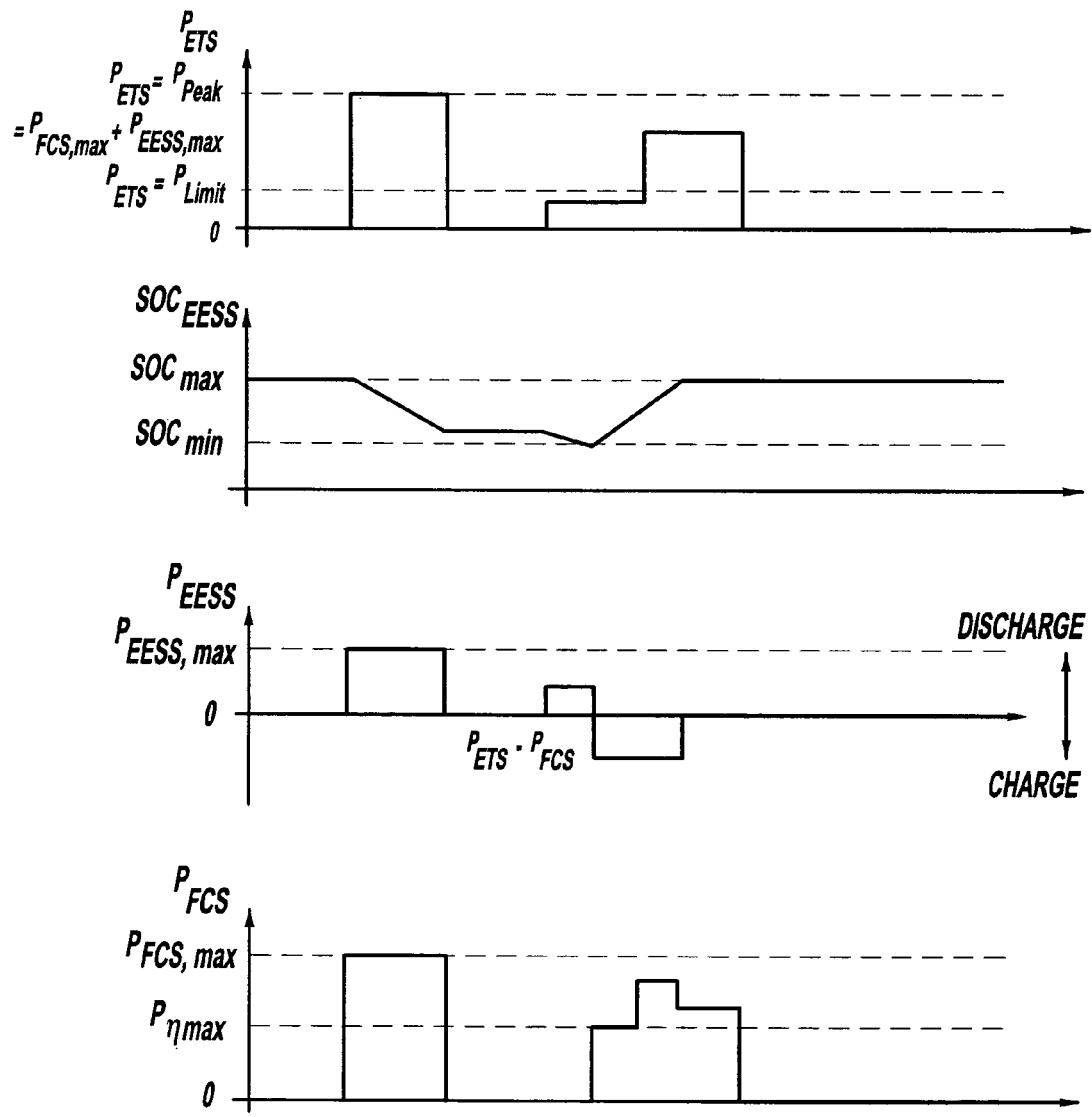
FIG. 4 is another series of graphs showing the relationship between an ETS power request, an EESS state of charge, EESS output power and FCS output power for a particular vehicle in another particular system state that employs a power algorithm of the invention for providing system efficiency.

FIG. 4 shows the same graphs as shown in FIG. 3, where the operation of the system goes between the peak ETS power request $P_{peak}$ and zero. As discussed above, the fuel cell system 12 will provide power above the power limit value $P_{limit}$, the EESS 14 will provide the requested power if it is below the power limit value $P_{limit}$, and both the EESS 14 and the fuel cell system 12 will provide power when the power request is between the maximum power able to be provided by the fuel cell system 12 and the peak power $P_{peak}$.

During certain system operations, both the fuel cell system 12 and the EESS 14 need to provide power to meet the power demand from the ETS 16. Thus, according to another embodiment of the present invention, the minimum state of charge limit $SOC_{limit}$ of the EESS 14 defined for when the fuel cell system 12 starts recharging the EESS 14 is greater than the minimum EESS SOC limit $SOC_{min}$ due to lifetime reasons to keep a certain acceleration capability of the vehicle 10.

To ensure the ability to capture regenerative braking from the ETS 16 anytime, a further additional option to the algorithm discussed above can be provided in that the maximum SOC limit $SOC_{max}$ for the EESS 14 defined for when the fuel cell system 12 stops recharging the EESS 14 is less than a true maximum EESS SOC limit to provide a certain charge capacity at any time.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A propulsion system comprising:
   a fuel cell system (FCS);
   an electric energy storage system (EESS); and
   an electric traction system (ETS) that is responsive to power from both the fuel cell system and the electric energy storage system, wherein the electric traction system preferably receives power from the fuel cell system if a power request from the electric traction system is above a determined power limit value and preferably receives power from the electric energy storage system if the power request from the electric traction system is below the determined power limit value.

2. The propulsion system according to claim 1 wherein the power limit value is determined by an efficiency curve of the fuel cell system, a maximum efficiency of the fuel cell system and the charge/discharge efficiency of the electric energy storage system.

3. The propulsion system according to claim 2 wherein the power limit value is defined by the location where the maximum efficiency of the fuel cell system times the charge/discharge efficiency of the electric energy storage system crosses the efficiency curve.

4. The propulsion system according to claim 1 wherein power from the fuel cell system is used to charge the electric energy storage system and provide the power request if the electric energy storage system state of charge falls to a predetermined minimum state of charge and the power request is below the power limit value.

5. The propulsion system according to claim 4 wherein power from the electric energy storage system is again used to provide the power request if the power request is still below the power limit value and the state of charge of the electric energy storage system reaches a predetermined maximum state of charge.

6. The propulsion system according to claim 4 wherein the power from the fuel cell system used to satisfy the power request and charge the electric energy storage system is provided at a power for maximum fuel cell system efficiency.

7. The propulsion system according to claim 4 wherein power from the fuel cell system does not fall below the power limit value.

8. The propulsion system according to claim 4 wherein the predetermined minimum state of charge of the electric energy storage system is greater than a true minimum state of charge of the electric energy storage system to keep a certain acceleration capability of the vehicle during any time of the operation of the propulsion system.

9. The propulsion system according to claim 5 wherein the predetermined maximum state of charge is less than a true maximum state of charge of the electric energy storage system so as to allow the electric energy storage system to capture regenerative braking power during any time of the operation of the propulsion system.

10. The propulsion system according to claim 1 wherein the fuel cell system and the electric energy storage system both provide power to the electric traction system if the power request is greater than a maximum power available from the fuel cell system.

11. The propulsion system according to claim 1 wherein the electric energy storage system is selected from the group consisting of a battery, an accumulator, a super-capacitor and combinations thereof.

12. The fuel cell propulsion system according to claim 1 wherein the propulsion system is part of a fuel cell hybrid vehicle.

13. A propulsion system for a fuel cell hybrid vehicle, said propulsion system comprising:
   a fuel cell system;
   an electric energy storage system; and an electric traction system that is responsive to power from both the fuel cell system and the electric energy storage system, wherein the electric energy storage system preferably receives power from the fuel cell system if a power request from the electric traction system is above a power limit value and preferably receives power from the electric energy storage system if the power request from the electric traction system is below the power limit value, said power limit value being determined by an efficiency curve of the fuel cell system, a maximum efficiency of the fuel cell system and the charge/discharge efficiency of the electric energy storage system, wherein the power limit value is defined by the location where the maximum efficiency of the fuel cell system times the charge/discharge efficiency of the electric energy storage system crosses the efficiency curve, and wherein power from the fuel cell system is used to charge the electric energy storage system and provide the power request if the electric energy storage system state of charge falls to a predetermined minimum state of charge and the power request is below the power limit value.

14. The propulsion system according to claim 13 wherein power from the electric energy storage system is again used to provide the power request if the power request is still below the power limit value and the state of charge of the electric energy storage system reaches a predetermined maximum state of charge.

15. The propulsion system according to claim 13 wherein the power from the fuel cell system used to satisfy the power request and charge the electric energy storage system is provided at a power for maximum fuel cell system efficiency.

16. The propulsion system according to claim 13 wherein power from the fuel cell system does not fall below the power limit value.

17. The propulsion system according to claim 13 wherein the predetermined minimum state of charge of the electric energy storage system is greater than a true minimum state of charge of the electric energy storage system to keep a certain acceleration capability of the vehicle during any time of the operation of the propulsion system.

18. The propulsion system according to claim 14 wherein the predetermined maximum state of charge is less than a true maximum state of charge of the electric energy storage system so as to allow the electric energy storage system to capture regenerative braking power during any time of the operation of the propulsion system.

19. The propulsion system according to claim 13 wherein the fuel cell system and the electric energy storage system both provide power to the electric traction system if the power request is greater than a maximum power available from the fuel cell system.

20. The propulsion system according to claim 13 wherein the electric energy storage system is selected from the group consisting of a battery, an accumulator, a super-capacitor and combinations thereof.

* * * * *